United States Patent [19]

Bhat

[11] 4,184,969

[45] Jan. 22, 1980

[54] FIRE- AND FLAME-RETARDANT COMPOSITION

[75] Inventor: Vasanth K. Bhat, Hamilton County, Ohio

[73] Assignee: Bhat Industries, Inc., Cincinnati, Ohio

[21] Appl. No.: 931,199

[22] Filed: Aug. 4, 1978

[51] Int. Cl.$^2$ .............................................. C09K 3/28
[52] U.S. Cl. ...................................... 252/8.1; 252/62; 428/921
[58] Field of Search ............... 252/8.1, 62; 106/18.13; 428/921

[56] References Cited

U.S. PATENT DOCUMENTS

| | | | |
|---|---|---|---|
| 3,903,337 | 9/1975 | Yamamoto et al. | 252/8.1 X |
| 4,038,451 | 7/1977 | Brown et al. | 252/8.1 X |

FOREIGN PATENT DOCUMENTS 556577 7/1923 France ...................................... 252/8.1

Primary Examiner—Leland A. Sebastian
Attorney, Agent, or Firm—Frost & Jacobs

[57] ABSTRACT

An inorganic composition for use as a fire- and flame-retardant additive to cellulose fiber thermal insulation, consisting essentially of 10 to 25 parts by weight of alumina trihydrate, 20 to 35 parts by weight of ammonium sulfate, 20 to 35 parts by weight of borax, 10 to 20 parts by weight of boric acid, up to 25 parts by weight of nepheline syenite, and up to 2 parts by weight of soda ash. Loadings of 12% to 18% by weight of the additive, based on the weight of the insulation, provide fire- and flame-retardant characteristics, non-corrosiveness, smoke suppression, and moisture absorption values within the limits prescribed by federal specificatons. The composition is also effective in mold inhibition and vermin control, and has relatively low density.

10 Claims, No Drawings

FIRE- AND FLAME-RETARDANT COMPOSITION

BRIEF SUMMARY OF THE INVENTION

This invention relates to a novel free-flowing, inorganic composition of matter that imparts fire- and flame-retardancy as well as non-corrosiveness to organic materials. The mixture of the invention has particular utility in the manufacture of, but is not limited to, loose-fill cellulosic fiber thermal insulation. Other possible applications are in an array of products including wood, lumber, plywood, chipboard, fiberboard, paper, fabrics, elastomers, adhesives, paints, and plastics.

Fire- and flame-retardants have been known since ancient times. A fire-retardant enables a material to resist burning when exposed to a relatively high-energy ignition source, such as a propane torch. A flame-retardant causes material to withstand burning when subjected to a low-energy ignition source, such as a cigarette.

In the early Egyptian era, various inorganic chemicals, such as clay, were used to make woven cotton flame-resistant. During the siege of Piraeus in Greece in 83 B.C., solutions of alum were used to make wooden storming towers resistant to fire.

In 1638, clay and gypsum were first used to make canvas scenery in Parisian theaters flame-resistant. In 1735, Wyld in England received a patent for treating cellulosic materials with a flame-retardant mixture of alum, ferrous sulfate, and borax. In 1821, Gay-Lussac in France invented a flame-retardant mixture of ammonium phosphate, ammonium chloride, and borax for treating linen and jute fabrics. In 1902, Perkins used stannic oxide to make cotton flannelette, lace curtains, muslin, and other fabrics flame-resistant. In the 1930's, flame-retardant mixtures containing metal oxides or salts, together with chlorinated organic compounds were developed for treating cotton. One such mixture comprised anthnony trioxide with or without zinc borate suspended in chlorinated paraffins or polyvinyl chloride.

In the past few years, four of the most widely used processes for making cotton and other cellulosics durably flame-retardant have involved the use of tetrakis (hydroxymethyl) phosphonium hydroxide and ammonia; Fyrol 76— a patented compound made by Stauffer Chemical, Pyrovatex CP— a patented product made by Ciba-Geigy, and THPOH-amide. All are organic products which contain both phosphorus and nitrogen. Phosphorus is believed to be the major contributor to the flame-retardancy, and nitrogen reduces the amount of expensive phosphorus required.

Among the best known inorganic chemicals used as flame-retardants in all sorts of cellulosic products are the borates. Materials treated with borax, boric acid or mixtures of these two have included timbers, boards, plywood, particleboard, wood fiber products, paper products, and cotton products ranging from textiles to mattresses. The retardant action of borates on the burning of cellulose is only partly understood; however, it is generally agreed that borates promote char formation, which inhibits combustion and also helps to protect the substrate from burning by isolating oxygen and heat from the fuel supply. Boric acid additionally possesses the properties of afterglow suppression, low water absorption, and good resistance to fungal growth. Cellulose treated with 100 percent boric acid at 20-30 percent loading shows excellent flame spread ratings (10 to 20, by ASTM E-84 25-ft tunnel test), but boric acid corrodes steel and aluminum which may come into contact with it. Borax and other alkaline substances such as sodium carbonate or lime are often added to minimize corrosion of steel and aluminum.

Especially in recent months, with boric acid in short supply, manufacturers of cellulose insulation have extended boric acid with borax and aluminum sulfate. One of the common formulations contains in weight percent, approximately 25% boric acid, 50% sodium tetraborate pentahydrate (5 mol borax), and 25% aluminum sulfate. Cellulose insulation containing this mixture of materials at approximately 20–30 weight percent loading has been alleged to give excellent flame spread ratings.

Applicant is also aware of the following United States Patents which disclose various flame-retardant chemical mixtures used for treating cellulose-based materials:

U.S. Pat. No. 2,867,549 discloses a process for flame proofing paper, in which a partially sized paper sheet is impregnated with a suspension comprising rosin dispersed in a solution of water-soluble flameproofing salts such as ammonium sulfate, monoammonium orthophosphate, and ammonium salt of phosphoric acid, the flameproofing salts being characterized by a maximum pH of about 7.

U.S. Pat. No. 3,027,326 discloses an insulation material of the shredded wood fiber type, formed by the mixing of 68 parts by weight of used newsprint, 4 parts by weight of ammonium sulfate, 6.5 parts by weight of boric acid, 4 parts by weight of potassium alum, and 4 parts by weight of Brilliant Green dye, in a dry mixer so as to produce a dry mix, transferring the dry mix to a wet mixer, wetting the dry mix by the addition of 10 parts by weight of water, and fluidizing the resulting wet mix by air so as to produce a dry product.

U.S. Pat. No. 3,912,792 discloses flame-retardant compositions comprising antimony trioxide and halogen containing organic compounds.

U.S. Pat. No. 4,012,507 discloses a vapor phase process in which boric acid, methyl alcohol, methyl borate, and water are used to impart smolder resistance to cotton batting and other cellulosic materials.

U.S. Pat. No. 4,038,451. discloses compositions comprising polyalkylene-polyamines and a mixture of mono- and diammonium phosphates as fire retardants for cellulosic substrates.

A primary object of the present invention is to provide a novel and improved composition of matter which is relatively inexpensive and more effective than the compositions of the prior art, and which excels in its fire-and flame-retardancy and non-corrosiveness when used as an additive to cellulose-based materials.

Another object is to provide to the manufacturers of cellulose fiber thermal insulation, a non-caking, free-flowing powdered chemical mixture that facilitates the manufacture of good, low-cost insulation.

A further object is to provide a chemical mixture that is effective in smoke suppression, mold inhibition, and vermin resistance when used as an additive to cellulosics.

Still another object is to use, as far as possible, raw materials that are inexpensive and abundantly available and to keep the use of expensive and scarce raw materials, such as boric acid, to a minimum.

Yet another object is to provide a chemical mixture which is relatively low in bulk density and which at a relatively low loading to cellulosic fiber, imparts all the required beneficial properties.

DETAILED DESCRIPTION

The objects of the present invention are accomplished by providing a composition consisting essentially of 10 to 25 parts by weight of alumina trihydrate, 20 to 35 parts by weight of ammonium sulfate, 20 to 35 parts by weight of borax, 10 to 20 parts by weight of boric acid, up to 25 parts by weight of nepheline syenite, and up to 2 parts by weight of soda ash.

Uniformly satisfactory results have been obtained in those instances where the composition of the chemical mixture consisted essentially of the aforementioned ingredients within the above ranges. Optimum results are obtained in a composition consisting essentially of about 12 to about 17 parts by weight of alumina trihydrate, about 25 to about 35 parts by weight of ammonium sulfate, about 25 to about 33 parts by weight of borax, about 12 to about 18 parts by weight of boric acid, about 5 to about 25 parts by weight of nepheline syenite, and up to 2 parts by weight of soda ash.

Preferred compositions of the present invention have been prepared as follows:

|  | Examples | | |
|---|---|---|---|
|  | Weight Percent | | |
| Raw Materials | A | B | C |
| Alumina trihydrate | 16.0 | 16.7 | 12.5 |
| Ammonium sulfate | 35.0 | 33.3 | 25.0 |
| Borax | 30.0 | 33.3 | 25.0 |
| Boric acid | 17.5 | 16.7 | 12.5 |
| Nepheline syenite | — | — | 25.0 |
| Soda ash | 1.5 | — | — |
| Total | 100.0 | 100.0 | 100.0 |

The component materials are pulverized to pass through at least an 80 mesh sieve and then thoroughly mixed. The mixture thus obtained is ready for use as an additive to cellulose-based materials such as ground newsprint or other forms of used paper. The amount of the composition of the present invention required to provide fire- and flame-retardancy, non-corrosiveness, and other characteristics described in the Federal Specification HH-I-515C, is approximately 12 to 18 percent by weight of the cellulose insulation. In contrast to this, prior art formulations require a loading of about 20 to 30 percent.

The standardized tests for cellulose insulation contained in the Federal Specification HH-I-515C are also described in the American Society for Testing Materials Specification ASTM C-739-73. The tests and the results of the tests as related to the chemical mixture of the present invention are summarized below:

1. Surface Burning Characteristics

The surface burning characteristics of the chemically treated cellulose fluff is determined by first conditioning the sample in a humidity chamber and then exposing it to a test fire in a test tunnel in accordance with the ASTM Method E-84-77. The flame spread over the sample surface, the smoke density and the fuel contribution are evaluated, and the material is classified.

2. Flame Resistance Permanency

The flame resistance permanency of the chemical mixture used as additive to the cellulose fluff is determined by subjecting the insulation to an accelerated aging procedure in which the sample is conditioned in a humidity chamber, and the aged sample is tested for fire retardancy.

3. Corrosiveness

The chemically treated cellulose fluff is subjected to an accelerated corrosion resistance test to determine the corrosive properties resulting from water and moisture vapor acting on the cellulose fibers, migrating varying amounts of chemical constituents to the insulation surfaces which may react with metal sidings and other metallic building materials. The corrosiveness against 2024-T3 bare aluminum; ASTM B-152, Type ETP, Cabra No. 110, soft copper; and low-carbon, commercial quality, cold rolled, shim steel is determined in a seven-day test. Noncorrosiveness implies the absence of any perforations when the metal specimen is observed over a chrome reflected 40-W appliance light bulb.

4. Moisture Absorption

The moisture absorption test consists of conditioning the chemically treated cellulose material in a humidity chamber at a certain relative humidity and then increasing the relative humidity. The moisture gain in the insulation should be no more than 15% by weight.

5. Thermal Resistance

The thermal resistance of the chemically treated cellulose insulation is determined in accordance with the ASTM Method C-518-70, in which a heat flow meter is used.

6. Starch

The presence of starch implies sustenance for vermin. A qualitative test in accordance with the ASTM Method D-591-67 is conducted on the chemically treated cellulose fluff. The sample prepared and treated with iodine solution per test method should not show a blue coloration for conclusive evidence of absence of starch.

7. Odor Emission

The odor emission test consists of placing the chemically treated cellulose fluff on a piece of butter in a closed pan, which is in turn put into a refrigerator for 24 hours. Upon removal of the pan from the refrigerator, the odor from the pan containing cellulose insulation specimen is compared to that from a pan without the insulation specimen. A detectable odor of objectionable nature recorded by two of three panel observes will constitute rejection of the material.

8. Density

The density of the chemically treated cellulose insulation is determined in accordance with the ASTM Method C-519-65, in which the weight of the insulation blown into a container of known volume is obtained and the density calculated. The density of the insulation should not exceed 3.0 lbs. per cubic foot.

Test results on chemically treated cellulose-based building insulation manufactured by the addition of the composition of the present invention to a ground newsprint are set forth in the Table below for demonstration of its effectiveness in meeting all the necessary tests described in the Federal Specification HH-I-515C.

The chemical formulae of the above specific Examples were as follows:

| | |
|---|---|
| Alumina trihydrate | $Al_2O_3 \cdot 3H_2O$ |
| Ammonium sulfate | $(NH_4)_2SO_4$ |
| Borax | $Na_2B_4O_7 \cdot 5H_2O$ |
| Boric acid | $H_3BO_3$ |
| Nepheline syenite | $3NaO_2 \cdot K_2O \cdot 4.5Al_2O_3 \cdot 20SiO_2$ |
| Soda ash | predominantly $Na_2CO_3$ |

TABLE

| Test | Method | Result | Accepted Limit |
|---|---|---|---|
| Flame Spread Rating | ASTM E-84-77 | 15 | 0 to 25 for Type I Class 25 |
| Flame Resistance | | 0% | |
| Permanency | ASTM C-739-73 | incr. | 20% max. incr. |
| Smoke Density | ASTM E-84-77 | 20 | 50 |
| Fuel Contributed | ASTM E-84-77 | 3.2% | 50% |
| Corrosiveness | ASTM C-739-73 | Non-corrosive | Non-corrosive |
| Moisture Absorption | ASTM C-739-73 | 9.1% | 15% max. gain |
| Thermal Resistance | ASTM C-518-70 | 3.67/in. | No limit |
| Starch | ASTM D-591-67 | No starch | No starch |
| Odor Emission | ASTM C-739-73 | No odor | No odor |
| Density | ASTM C-519-65 | 2.7 pcf | 3.0 pcf |

The tabulated test results relate specifically to Example A above. The chemical loading was 17.5% by weight of the cellulose insulation. Although a few relatively insignificant differences in the test results were observed when Composition B and C were used in lieu of Composition A, they all fell within acceptable limits, and the insulation meets the standards set forth by the Federal Specification HH-I-515C in all compositional ranges covered by the composition of the present invention.

None of the prior art fire- and flame-retardant compositions described above, including those of the referenced United States patents, exhibits a Flame Spread Rating (by ASTM E-84-77 Test Method) as low as 15 at a loading of 17.5% by weight.

The composition of the present invention may be applied in particulate form as a dry mixture during the grinding of newsprint and the like to form cellulose fiber thermal insulation, or may be applied as an aqueous slurry as an incident of the grinding of used paper. The manner of application is well known to those skilled in the art and hence is not described in detail.

The Federal Specification HH-I-515C is presently being revised, and the proposed Federal Specification HH-I-515D dated Mar. 23, 1978 contains tests for critical radiant flux, smoldering combustion, and fungi resistance. The critical radiant flux of exposed attic floor insulation is determined using a radiant heat energy source in a radiant panel test chamber. The value of the critical radiant flux should be equal to or greater than 0.12 watts per $cm^2$. In the smoldering combustion test, a lighted cigarette is inserted vertically with the lit end upward into the center of an insulation specimen. The burning of the cigarette is allowed to proceed undisturbed for at least two hours or until the smoldering ceases. The insulation should show no evidence of flaming combustion and its weight loss should not be more than 15% of its initial weight. The fungi resistance test is performed in accordance with MIL-STD-810, Method 508. In this test the insulation samples are tested at 86° F. and 95% R.H. for 28 days. The core of gypsum wall board is used as the control. The insulation material should show no more fungal growth than the control material.

The composition of the present invention meets or exceeds the test requirements for critical radiant flux, smoldering combustion, and fungi resistance. As little as 12% chemical loading by weight of the insulation provides the safety characteristics required by the Federal Specification HH-I-515C and the proposed additions of HH-I-515D.

The mechanism by which the raw materials, alumina trihydrate, ammonium sulfate, borax, boric acid, nepheline syenite, and soda ash in the proportions indicated herein in the preferred embodiment of this invention, impart the beneficial properties to the treated cellulose fluff is rather complex and cannot be fully explained. None of the raw materials singularly meets all the requirements, and the composition of the invention is thus believed to be synergistic. Alumina trihydrate is known to be a fire retardant and smoke suppressor, but is not highly effective for this purpose and would (if used alone) require a loading of about 32% by weight to achieve a Flame Spread Rating of 25 or less. Such a high loading may increase the density above the acceptable limit. Ammonium sulfate is an effective fire-retardant, but by itself it is corrosive to copper, has a high moisture absorption tendency, and supports fungal growth. Ammonium sulfate is relatively inexpensive, abundant, and in combination with the other raw materials used in the composition of this invention, it lowers the total chemical loading requirements in the manufacture of cellulose insulation. Borax used in the present invention is preferably sodium tetraborate pentahydrate. It is possible to substitute another form of borax, viz., sodium tetraborate decahydrate. Borax is a well-known fire retardant; it does not corrode building metals; and it inhibits fungal growth. However, borax is not a smoke suppressor. Boric acid by itself is corrosive to steel and aluminum although it has excellent corrosion properties against copper. Boric acid is an effective afterglow inhibitor in addition to being a fire retardant. However, boric acid is relatively expensive and scarce. It is an advantage of the present invention that crude boric acid ($H_3BO_3.Na_2SO_4$) may be used. Nepheline syenite has not been previously used as a fire retardant to the best of applicant's knowledge. The use of nepheline syenite as an ingredient in the chemical mixture of the present invention is thus novel. It has been found that nepheline syenite not only adds to the fire retardance, it somehow suppresses the ammonia smell of the chemical mixture, and it also renders the insulation unattractive to rodents and roaches of various types. Nepheline syenite does not support fungal growth, and it controls afterglow. Soda ash is a buffer which maintains the pH level of the chemical mixture at the desired level of about 8.0 to 8.5.

In the industry, some confusion exists regarding the pH of the chemically treated cellulose insulation. Some believe that a neutral pH of 7.0 necessarily and sufficiently equates with non-corrosiveness. Many examples can be given to refute this belief. In the present invention, the pH of the chemical mixture is about 8.2.

The composition of the present invention, as an additive to ground newsprint or other forms of waste paper, thus excels in its fire- and flame-retardancy; non-corrosiveness; ability to suppress smoke, afterglow, and fungal growth; and resistance to vermin.

The composition of the present invention is free-flowing and does not cake up. The presently available chemical mixtures tend to cake up, harden, and flow poorly, and hence manufacturers of cellulose insulation are reportedly plagued with operational problems. The composition of the present invention eliminates this problem, thereby saving both time and money.

More specifically, the broad and preferred compositions of the present invention, after application to cellulose fiber thermal insulation at a loading of about 12% to about 18% by weight of the insulation provide a product exhibiting a Flame Spread Rating not greater than 20, a Flame Resistance Permanency not greater than 10%, a Smoke Density not greater than 25, a Corrosiveness rated as non-corrosive, and a Moisture Absorption not greater than 10%, by the herein described tests.

The chemical mixture of the present invention uses only 10 to 20 parts by weight of boric acid. This represents about 1.7% to 2.4% by weight of the insulation. Cellulose insulation which meets the afterglow control and combustion smoldering requirements is normally treated with boric acid or a boric acid-containing chemical mixture. Published literature indicates that the amount of boric acid necessary to provide all the required safety characteristics to the cellulose-based insulation, is at least about 5 percent by weight of the insulation. Thus, the composition of the present invention enables one to reduce the use of expensive and scarce boric acid by at least 50 percent. The chemical mixture of the present invention is relatively light. Its bulk density is about 40 pcf. This feature together with the low loading requirement (only 12 to 18 percent by weight of the insulation), permits the production of a relatively light-weight insulation having a high thermal resistance, and a better surface coverage at a relatively low cost.

What is claimed is:

1. An inorganic composition having excellent fire- and flame-retardant characteristics, low moisture absorption, and substantially no corrosiveness to aluminum, copper, and steel, consisting essentially of 10 to 25 parts by weight of alumina trihydrate, 20 to 35 parts by weight of ammonium sulfate, 20 to 35 parts by weight of borax, 10 to 20 parts by weight of boric acid, up to 25 parts by weight of nepheline syenite, and up to 2 parts by weight of soda ash.

2. The composition claimed in claim 1, consisting essentially of about 12 to about 17 parts by weight of alumina trihydrate, about 25 to 35 parts by weight of ammonium sulfate, about 25 to about 33 parts by weight of borax, about 12 to about 18 parts by weight of boric acid, about 5 to 25 parts by weight of nepheline syenite, and up to 2 parts by weight of soda ash.

3. The composition claimed in claim 1 or 2, exhibiting a Flame Spread Rating not greater than 20, a Flame Resistance Permanency not greater than 10%, a Smoke Density not greater than 25, a Corrosiveness rated as non-corrosive, and a Moisture Absorption not greater than 10%, by the herein described tests, after application to cellulose thermal insulation at a loading of about 12% to about 18% by weight of said insulation.

4. The composition claimed in claim 1, consisting essentially of, in weight percent, 16% alumina trihydrate, 35% ammonium sulfate, 30% borax, 17.5% boric acid, and 1.5% soda ash.

5. The composition claimed in claim 1, consisting essentially of, in weight percent, 16.7% alumina trihydrate, 33.3% ammonium sulfate, 33.3% borax, and 16.7% boric acid.

6. The composition claimed in claim 1, consisting essentially of, in weight percent, 12.5% alumina trihydrate, 25% ammonium sulfate, 25% borax, 12.5% boric acid, and 25% nepheline syenite.

7. The composition claimed in claim 1, wherein said borax is sodium tetraborate pentahydrate or sodium tetraborate decahydrate.

8. The composition claimed in claim 1, wherein said boric acid is refined or crude boric acid containing sodium sulfate.

9. Cellulose fiber thermal insulation containing from about 12% to about 18% by weight of said insulation of a fire- and flame-retardant composition consisting essentially of 10 to 25 parts by weight of alumina trihydrate, 20 to 35 parts by weight of ammonium sulfate, 20 to 35 parts by weight of borax, 10 to 20 parts by weight of boric acid, up to 25 parts by weight of nepheline syenite, and up to 2 parts by weight of soda ash.

10. The thermal insulation claimed in claim 9, exhibiting a Flame Spread Rating not greater than 20, A Flame Resistance Permanency not greater than 10%, a Smoke Density not greater than 25, a Corrosiveness rating of non-corrosive, and a Moisture Absorption not greater than 10%, by the herein described tests.

* * * * *